United States Patent [19]
Eberhardt et al.

[11] Patent Number: 6,161,285
[45] Date of Patent: Dec. 19, 2000

[54] METHOD FOR MANUFACTURING A POPPET VALVE FROM A γ-TIAL BASE ALLOY

[75] Inventors: Nico Eberhardt, Schwarzheide, Germany; Sieghard Wacker, Bichlbach; Hans Bogner, Lechaschau, both of Austria

[73] Assignee: Schwarzkopf Technologies Corporation, New York, N.Y.

[21] Appl. No.: 09/315,579

[22] Filed: May 20, 1999

[30] Foreign Application Priority Data

Jun. 8, 1998 [AU] Australia ................................ 381/98 U

[51] Int. Cl.⁷ ...................................... B21K 1/20
[52] U.S. Cl. .................................. 29/888.451; 29/888.453
[58] Field of Search ...................... 29/888.451, 888.452, 29/888.4; 123/188.3, 188.2; 72/260, 256, 257

[56] References Cited

U.S. PATENT DOCUMENTS

| | | | |
|---|---|---|---|
| 2,452,628 | 11/1948 | Bartlett et al. | 29/888.452 |
| 2,452,636 | 11/1948 | Cunningham et al. | 29/888.452 |
| 3,536,053 | 10/1970 | Vitcha | 123/188.2 |
| 3,636,605 | 1/1972 | Vitcha et al. | 123/188.2 |
| 4,926,534 | 5/1990 | Windelbandt | 29/888.452 |
| 5,778,534 | 7/1998 | Kim | 29/888.451 |

FOREIGN PATENT DOCUMENTS

| | | |
|---|---|---|
| 0 543 353 A1 | 5/1993 | European Pat. Off. . |
| 0 751 228 A1 | 1/1997 | European Pat. Off. . |

*Primary Examiner*—I Cuda
*Attorney, Agent, or Firm*—Morgan & Finnegan, L.L.P.

[57] ABSTRACT

A method for the manufacture of a poppet valve made of a γ-TiAl base alloy for internal combustion engines. In this method, the γ-TiAl blank is first subjected to primary forming, for example, by extrusion, in such a manner that thereafter it has approximately the diameter of a valve head and the material properties required for the valve head. The secondary forming is then carried out by extrusion using a die designed in such a manner that the diameter of the inlet opening corresponds approximately to that of the blank after primary forming, and a cylindrical section corresponding to this diameter, followed by a transition in the form of a narrowing which corresponds approximately to the valve cone to the outlet opening. The outlet opening has at least approximately the same diameter as the diameter of the valve shaft. The extrusion process is terminated when the desired thickness of the valve head has been attained.

10 Claims, 2 Drawing Sheets

METHOD FOR MANUFACTURING A POPPET VALVE FROM A γ-TIAL BASE ALLOY

BACKGROUND OF THE INVENTION

1. Field of the Invention

The present invention relates to a method for the manufacture of a poppet valve made of a γ-TiAl base alloy for internal combustion engines, with valve cross sections of cylindrical parts having the thickness S, cone and shaft, in a shape which is at least close to the final dimensions of the valve shape by the primary forming of a homogeneous blank, followed by a secondary forming.

2. Description of the Related Art

Alloys made of γ-TiAl base belong to the group of intermetallic materials whose properties are intermediate between those of metals and those of ceramics.

γ-TiAl base alloys of industrial importance are alloys with an aluminum content of 45–48 at %, which is in practice two-phase alloys with a γ-TiAl and an $\alpha_2$-$Ti_3Al$ phase, or polyphase alloys, if additional alloy elements that improve the properties are added.

As additional alloy elements, it is preferred to use chromium, manganese and vanadium to increase the ductility at room temperature; niobium, tantalum, molybdenum and tungsten to increase the resistance to oxidation and to increase the rigidity; and silicon, boron and carbon to increase the thermal resistance, the creep resistance, for a targeted setting of lamellar structural types, and to improve the processability of the alloys-in-question.

These alloy elements, in total, account for approximately 1–20 at % in the γ-TiAl base alloys of practical importance.

Since γ-TiAl base alloys present, in addition to low density, good resistance to oxidation and good mechanical properties up to temperatures of 750° C., they are increasingly used, among other applications, for blades of gas turbines and valves for internal combustion engines.

Since most intermetallic materials, including γ-TiAl base alloys, present a brittle behavior at room temperature and because of the strong extensibility rate dependence of the yield stress, also at temperatures above the brittle/ductile transition temperature, the manufacture of finished products is often involved from the point of view of process technology, expensive, and strongly dependent on the forming conditions.

It is possible to manufacture the starting material by melt or powder metallurgical methods. To achieve the best possible material properties, which depend very strongly in the case of γ-TiAl base alloys on particle size, phase distribution and structural homogeneity, and to achieve the desired final form, additional mechanical deformation of the starting material is often required. Superplastic forming, extrusion, drop forging or rolling, as a rule under isothermic or near isothermic conditions, have been successfully used.

DE-PS 4 318 424 describes, e.g., a method for the manufacture of formed bodies made of γ-TiAl alloys, such as valves and poppet valve heads for motors. In this method, a casting was first deformed in a temperature range of 1050–1300° C. under near isothermic conditions with a high degree of forming, then it was cooled, and finally it was subjected to superplastic forming until a formed part having approximately the final dimensions was obtained in a temperature range of 900–1100° C., and with low extension speed of $10^{-4}$ to $10^{-1}$/sec.

One drawback in the above-described method is that it is relatively slow, involved as far as process technology is concerned, and thus expensive.

SUMMARY OF THE INVENTION

One object of the present invention therefore is to create a method for the manufacture of poppet valves for internal combustion engines, made of γ-TiAl base alloys, which is implemented with an advantageous benefit/cost ratio, and nevertheless achieves the required material properties to meet the demands for such construction parts.

In accordance with the present invention, this and other objects and advantages are achieved by carrying out a primary forming in a manner where the γ-TiAl blank, after the forming, presents approximately the diameter of the valve head and the material properties required for the valve head. A secondary forming is then performed by extrusion of the primary formed blank using a die designed in such a manner that the diameter of the inlet opening approximately corresponds to that of the primary formed blank, and an approximately cylindrical section of die goes through a cone-shaped zone that approximately corresponds to the valve cone, into the shape of the exit opening, which exit opening has a diameter which is at least approximately identical to the diameter of the valve shaft, and wherein the extrusion process is terminated when the desired thickness of the valve head has been attained.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

Figure 1:
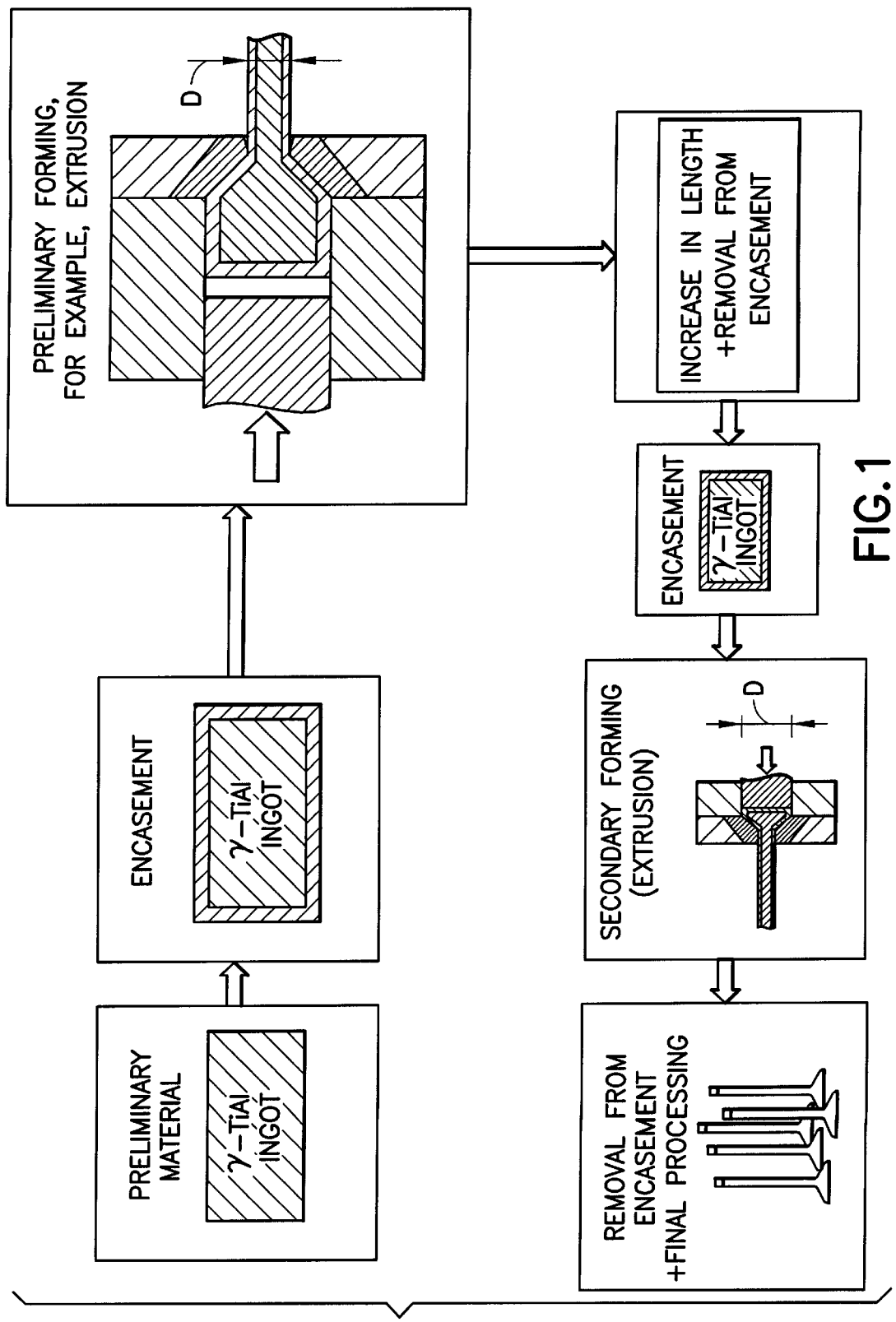
FIG. 1 is a flow chart illustrating the course in principle of the manufacturing method according to the present invention.
Figure 2:
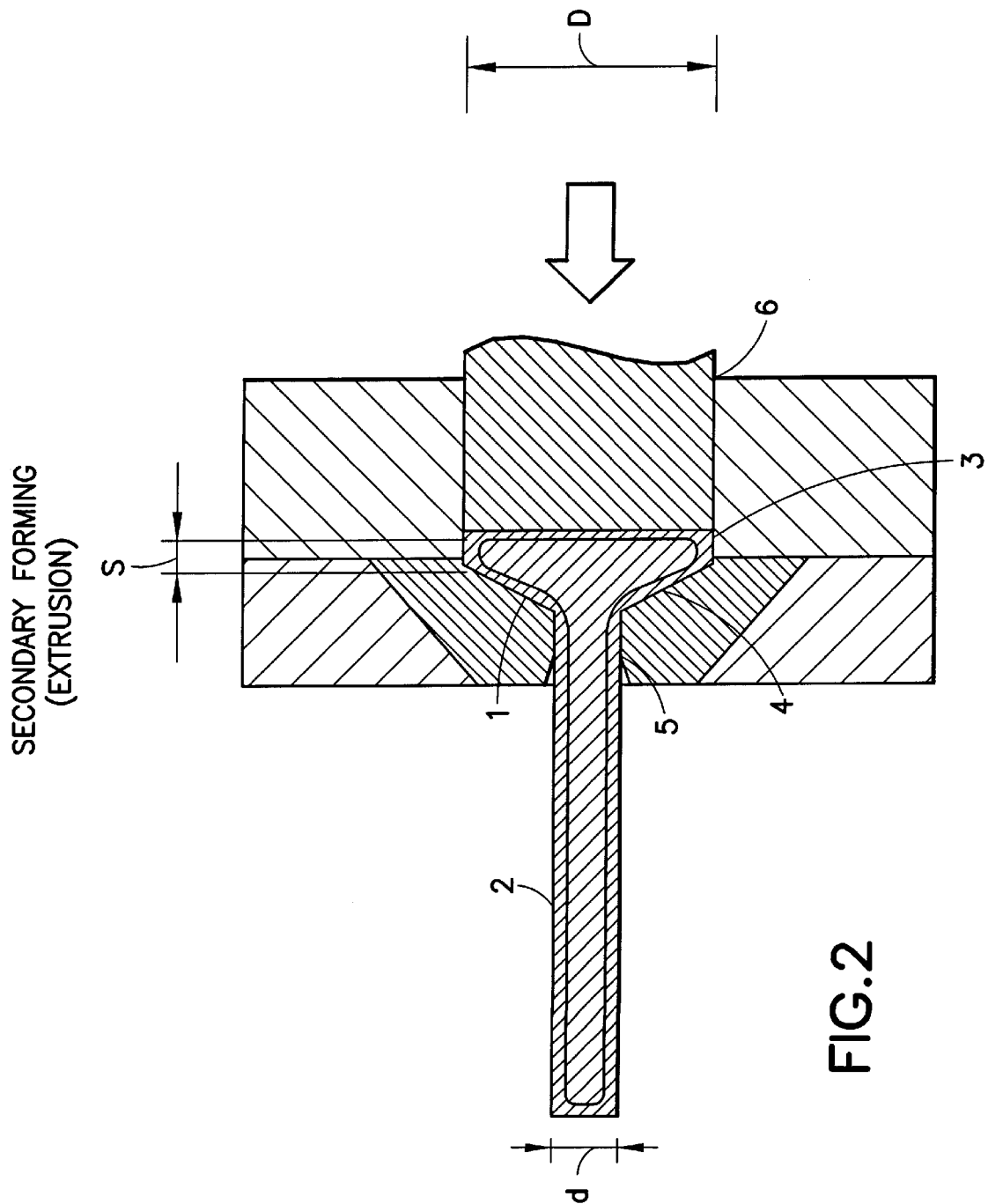
FIG. 2 illustrates the finishing section of the extrusion according to FIG. 1 on a larger scale.

The present invention provides a method for manufacturing a poppet valve made from γ-TiAl base alloys for an internal combustion engine, which provides an advantageous benefit/cost ratio and achieves the required material properties to satisfy the demands for such construction parts.

According to the present invention, the primary forming is carried out in a manner where the γ-TiAl blank, after the forming, presents approximately the diameter D of the valve head and the material properties required for the valve head. A secondary forming is then performed by extrusion of the primary formed blank using a die designed so that the diameter of the inlet opening approximately corresponds to that of the primary formed blank, and an approximately cylindrical section of the die goes through a cone-shaped zone that approximately corresponds to the valve cone, into the shape of the exit opening, which exit opening has a diameter that is at least approximately identical to the diameter D of the valve shaft, and wherein the extrusion process is terminated when the thickness S of the valve head has been reached.

The primary forming preferably takes place by extrusion, but can also be carried out using other methods (e.g., round rolling or round hammering). As a result of the two forming processes of the present invention, a very high degree of deformation is reached, particularly in the shaft, in the range between 50 and 500:1, the like of which have never been used in the deforming of γ-TiAl base alloys, and, surprisingly, was achieved without encountering a great many problems. The manufacture of the valve head and of the valve shaft as a single component can be solved with the method of the present invention without any problem, in contrast to valves made of steel, which, according to the state of the art, are manufactured predominantly as two-part components, namely the valve head with the shaft portion attached by forming and the shaft remainder, which are then connected to each other by frictional welding.

If the primary forming occurs by extrusion, it is particularly advantageous to work at temperatures between 1000° C. and 1350° C. and with extensibility rates of approximately $10^{-1}$ to 1/sec and forming degrees in the range of 5–50:1.

The secondary forming by extrusion is advantageously carried out at temperatures between 1000° C. and 1420° C., with extensibility rates of approximately $10^{-2}$ to $10^{2}$/sec and forming degrees in the range of 5–80:1 by comparison with a blank that has only undergone the primary forming. If the forming temperature is in the upper temperature range, the alpha-transition temperature can be exceeded during the extrusion, which favors the formation of a finely lamellar structure with high creep resistance. Such structural types, which are characterized by extremely fine structure of lamellae, can only be manufactured by thermomechanical finishing because subsequent heat treatments lead to a structure with clearly broader lamellae separations between lamellae.

To decrease the oxidation of the γ-TiAl base alloy during the primary and secondary forming, it is advantageous to encase the alloy before any forming process in a protective jacket. It has been particularly advantageous to use stainless steel as material for the encasement respective canning, and to provide for a diffusion barrier between the encasement material and γ-TiAl material in the form of a molybdenum layer. The diffusion barrier prevents the formation of a eutectic with low melting point between the TiAl alloy and the iron of the protective jacket. The molybdenum layer can be obtained, for example, by plasma spraying onto the surface of the TiAl alloy. In addition, the TiAl alloy may be packaged in molybdenum foil.

The above-described encasement is only a particularly advantageous variant of the method according to the present invention. If the process is carried out appropriately, it is possible to use a protective jacket made of glass instead of the above-described encasement made of steel. By the use of protective gas, water mists or similar measures to protect against oxidation, it is possible, under certain circumstances, to omit any encasement.

After the first forming, the length of the blank is increased to the desired length, and, as a rule, the encasement is removed by mechanical processing. The blank is then again encased and subjected to secondary forming by extrusion. With appropriate dimension selection for the encasement, it is also conceivable that the condition of the encasement for the primary forming is still so good after the forming that it does not have to be removed before the secondary forming; instead, it can be used again for the secondary extrusion.

It is particularly advantageous for the material for the extrusion die to be made of a molybdenum alloy with high resistance to heat, for example, MHC with 1.2 wt % hafnium, 0.1 wt % carbon, the rest molybdenum.

An alloy having the composition 46.5 at % Al, 2.5 at % Cr, 1 at % Nb, 0.5 at % Ta, 0.1 at % B, the rest Ti, has been shown to be particularly well suited as a γ-TiAl alloy for the special application as a poppet valve for internal combustion engines.

Referring to the drawings, the present invention is further explained below with reference to the following manufacturing example.

EXAMPLE

γ-TiAl ingots having the composition Ti-46.5Al-2.5Cr-1Nb-0.5Ta-0.1B (at %) were prepared by casting, each ingot having a diameter of approximately 180 mm and a length of 450 mm. Using stainless steel X5CrNi1810, hollow cylindrical extrusion encasements with a length of 410 mm, an external diameter of 206 mm and an internal diameter of 164.8 mm were manufactured. The cast skin was removed from the cast γ-TiAl ingots by turning, the ingots were adapted to the internal geometry of the extrusion encasements and cleaned with alcohol, the ingots were then subjected to sand blasting and a molybdenum layer was applied to their surfaces by plasma spraying; the ingots were then packed in molybdenum foil and inserted into the extrusion encasement. To close the extrusion encasement, the bottom and the top part of the cylinder-shaped extrusion encasement were welded with corresponding steel parts. The first forming of the encased γ-TiAl ingot was then carried out by extrusion. For that purpose, the ingots were first inductively preheated in three steps to 700° C., 800° C. and 1150° C. After the preheating, the extrusion blanks were then again inductively heated to the extrusion temperature of 1230° C. The extrusion die used had an inlet diameter of 210 mm, a cone-shaped opening with an angle of 150°, and an external diameter of 60 mm, which corresponds approximately to the dish diameter D of the finished valve. The compression ratio was 12.2:1. The compression rate was set manually, and it was approximately 60 mm/sec. As a result of this extrusion, the extrusion blank produced presented the required sealing properties and mechanical rigidities required for the dish of the finished valve.

The extruded γ-TiAl rods that had been subjected to primary forming were then subjected to a length increasing treatment to a length of 40 mm using a water jet cutting device. The steel capsule was then removed from the blanks by turning.

These blanks were again fitted, as during the first encasement process, with a molybdenum diffusion barrier by plasma spraying. The step of wrapping in molybdenum foil was omitted. The blanks were then inserted into cylindrical steel capsules made of St37 and having a length of 45 mm, an external diameter of 57 mm and an internal diameter of 47 mm, and the encasement was closed by the welding of a bottom part. The second forming step was carried out by extrusion in the γ/α domain at a forming temperature of 1300° C. The die was manufactured from a MHC alloy (Mo-1.2Hf-0.1C). The inlet diameter 6 of the die was 60 mm and the cone-shaped opening 4 had an angle of 105°. The external diameter 5 of the die corresponded approximately to the desired diameter d of the valve shaft 2. The inlet diameter 6 corresponded approximately to the diameter D of the valve head. The die was greased with a graphite oil mixture prior to the extrusion. The extrusion process was intentionally interrupted after a predetermined stamp path as soon as the desired thickness S of the valve head was reached. Since, in this manner, the valve head is not deformed, or to only a small degree, the use of primary deformed preliminary material, which already has the required material properties for the valve head, is a prerequisite for the manufacturing process according to the invention. After the extrusion process, the final processing of the pressed blanks to the desired final dimension was achieved by turning.

Although an illustrative preferred embodiment has been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method for the manufacture of a poppet valve made of γ-TiAl base alloys for internal combustion engines, the valve including a cylindrical head having a desired thickness and a desired head diameter, a cone having a desired shape, and a shaft having a desired shaft diameter, said method comprising:

carrying out a primary forming of a homogenous γ-TiAl blank in a manner that, after the primary forming, the blank has a diameter that is approximately equal to the desired head diameter; and performing a secondary forming by extrusion of the primary formed blank using a die having an inlet opening with a diameter that is approximately equal to the diameter of the primary formed blank, the die also having a substantially cylindrical section that goes through a cone-shaped zone, which corresponds approximately to the desired shape of the valve cone, into the shape of an exit opening, which exit opening has a diameter that is at least approximately equal to the desired shaft diameter of the valve shaft, and wherein the extrusion process is terminated when the desired thickness of the valve head has been reached.

2. The method for the manufacture of a poppet valve according to claim 1, wherein the primary forming is carried out by extrusion at a temperature between 1000° C. to 1350° C., extensibility rate of approximately $10^{-3}$ to 1/sec, and degree of forming in the range from 5 to 50:1.

3. The method for the manufacture of a poppet valve according to claim 1, wherein the secondary forming is carried out at a temperature between 1000° C. to 1420° C., at extensibility rate of approximately $10^{-2}$ to $10^2$/sec, and degree of forming in the range from 5 to 80:1 by comparison with the blank subjected to primary forming.

4. The method for the manufacture of a poppet valve according to claim 2, wherein the blank is encased in a protective jacket before the primary and secondary forming.

5. The method for the manufacture of a poppet valve according to claim 3, wherein the primary formed blank is encased in a protective jacket before the secondary forming.

6. The method for the manufacture of a poppet valve according to claim 4, wherein steel is used as a material for the encasement, and a diffusion barrier in the form of a molybdenum layer is provided between the encasement material and the γ-TiAl material of the blank.

7. The method for the manufacture of a poppet valve according to claim 5, wherein steel is used as a material for the encasement, and a diffusion barrier in the form of a molybdenum layer is provided between the encasement material and the γ-TiAl material of the primary formed blank.

8. The method for the manufacture of a poppet valve according to claim 2, wherein a molybdenum alloy is used as a material for the extrusion die.

9. The method for the manufacture of a poppet valve according to claim 3, wherein a molybdenum alloy is used as a material for the extrusion die.

10. The method for the manufacture of a poppet valve according to any one of claims 1–9, wherein the γ-TiAl alloy comprises 46.5 at % Al; 2.5 at % Cr; 1 at % Nb; 0.5 at % Ta; 0.1 at % B; the rest is Ti.

* * * * *